Aug. 12, 1958
S. C. TUCKER
2,846,807
LIVE BAIT DISPENSER
Filed June 10, 1957
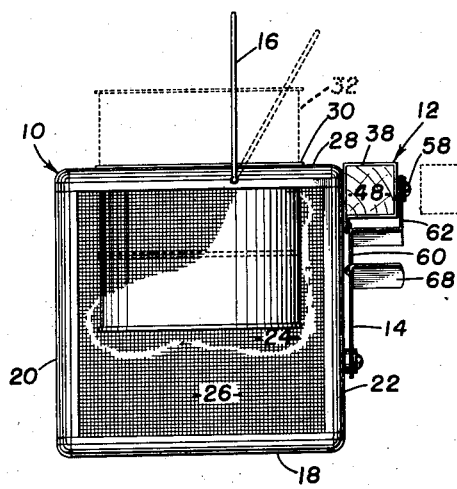
FIG. 1.
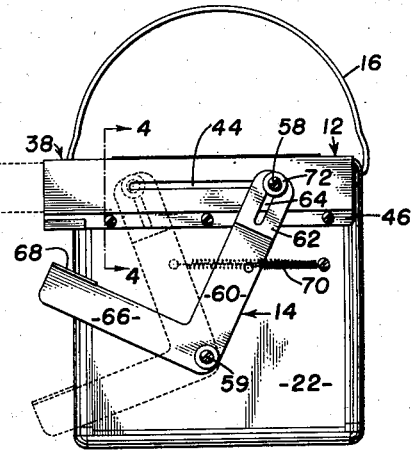
FIG. 2.
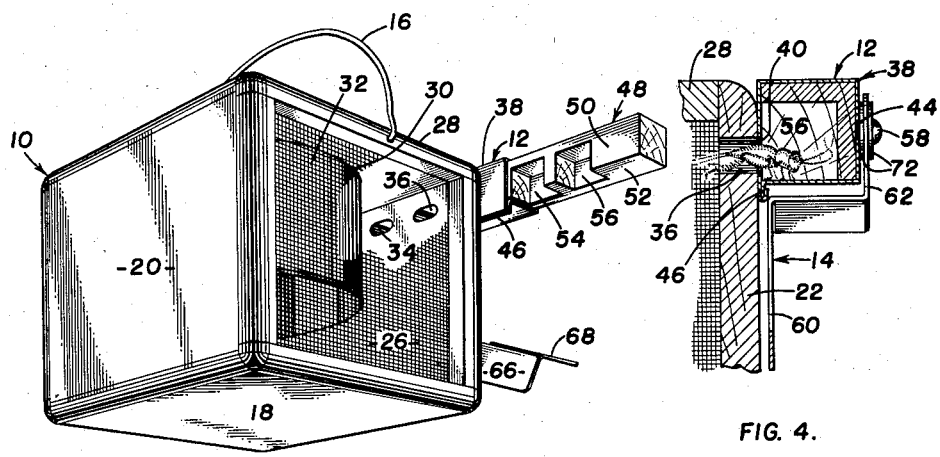
FIG. 3.
FIG. 4.
STEPHEN C. TUCKER INVENTOR
BY *Beale and Jones*
ATTORNEY

United States Patent Office 2,846,807
Patented Aug. 12, 1958

2,846,807
LIVE BAIT DISPENSER

Stephen C. Tucker, Atlanta, Ga., assignor of one-half to J. Ralph Hart, Whitesburg, Ga.

Application June 10, 1957, Serial No. 664,645

6 Claims. (Cl. 43—55)

This invention relates to a live bait dispenser. More specifically, this invention relates to a dispenser which takes advantage of the natural characteristics of live bait to make it readily available to the fisherman.

It has been observed that small insects which are effective as fish bait and which comprise a group including roaches and crickets have a tendency to crawl upwardly in an attempt to find refuge in a high place and to seek dark recesses or tunnels for their protection. This invention takes advantage of these tendencies of such insects by providing an insect-holding receptacle near the top of which is disposed a dispensing device accessible through a tunnel-like aperture in the receptacle. The insect, therefore, climbs up the wall of the receptacle and through the tunnel and ultimately into the dispensing mechanism from which he is easily dispensed by the fisherman desiring him.

While the prior art includes devices for dispensing live fish bait, none of them takes advantage of these tendencies of the insect to make him readily available to the fisherman.

It is, therefore, an object of this invention to provide a dispenser which takes advantage of the natural tendencies of the live bait insect to seek high recessed areas to make such bait accessible.

It is another object of this invention to provide a simple, yet extremely effective live bait dispenser which may be economically manufactured.

Still another object of this invention is to provide a live bait dispenser which affords an effective receptacle for live bait insects between periods of use as a dispenser.

This invention embodies other novel features, details of construction and arrangement of parts which are hereinafter set forth in the specification and claims, and illustrated in the accompanying drawing, wherein:

Fig. 1 is a front elevational view of the invention showing a portion of the screen on the front wall partially broken away and showing in dotted lines an alternate position of the sleeve provided in the access hole;

Fig. 2 shows an elevational end view showing in dotted lines an alternate position for the dispenser plunger and its actuator.

Fig. 3 is a perspective view taken slightly from below showing the device with a portion of the screen broken away to expose the apertures in the side wall; and Fig. 4 is an enlarged sectional view taken on the line 4—4 of Fig. 2.

Briefly, the invention comprises a receptacle having a plurality of walls, one of said walls having an aperture therethrough with a dispensing plunger on the outside thereof, said plunger adapted to close said aperture and said plunger having a pocket therein presenting an opening adapted to overlie the aperture so that there is communication from the receptacle into the pocket, said plunger being adapted to be reciprocated forward to a position where the pocket opening is exposed, whereby when the plunger is in the first position live bait can climb through said aperture into said pocket and whereby when said plunger is moved to second position, said bait drops from said recess ready for use.

Referring more specifically to the drawings, my invention comprises a receptacle generally designated 10 in Fig. 1. To the side at the upper portion of said receptacle is mounted a dispensing mechanism 12. A V-shaped mechanism actuator is generally designated 14 and is pivoted to a wall of the receptacle. A bail type handle 16 is provided for easy portability of the device.

Still more specifically, the receptacle 10 is preferably cube shaped and includes an imperforate bottom wall 18, having side walls extending upwardly therefrom. Opposite side walls 20 and 22 are substantially imperforate. The alternate side walls 24 and 26 are of wire mesh to allow for easy circulation of air for the insects contained in the receptacle. A top wall 28 is attached to the upper end of the side walls and has a circular access hole 30 centrally located therein. Contained in the access hole and adapted for limited reciprocation therein, is a sleeve 32. Sleeve 32 provides means blocking the escape of the insect through access hole 30 and is adapted to telescope upwardly as shown in Fig. 1 to allow the fisherman to put his hand in the receptacle to brush the insects off the upper portions of the sidewalls of the receptacle thus causing them to seek refuge, as will be understood.

As shown in Fig. 3, the side wall has tunnel-like apertures 34 and 36 near the upper end thereof. Mounted on the outside of the side wall over said apertures is a dispenser plunger support 38 of tubular nature. In cross section the support is preferably square (see Fig. 4). It is provided with apertures 40 and 42 (not shown) positioned in alignment with the apertures in the apertured wall. On the opposite side of the supports from the wall 22 is a slot 44 running longitudinal thereof. The support may be made of metal sheet formed about a square mandrel and having lap portion 46 which may be apertured to provide means for mounting (see Fig. 2).

Received within the plunger support 38 is the dispenser plunger 48 comprising a rectangular block. Plunger 48 has an inside surface 50 adapted to ride against the apertured wall of support 38 and a lower surface 52 adapted to ride on the bottom wall of the support 38. The plunger is pocketed as at 54 and 56 (see Fig. 3), each of said pockets having an opening in the inside surface 50 and the lower surface 52 of the plunger. Plunger 48 is adapted to assume one of two positions, namely, a first position wherein pockets 54 and 56 are in registry with the apertures 34 and 36 in the wall of the receptacle (see Fig. 4); and a second position attained through forward movement of plunger 48 wherein the openings of the pockets 54 and 56 are exposed forward of said support.

Means for moving the dispensing plunger comprises a pin or screw 58 fastened to said plunger and extending through said slot. By this means the extent of travel of the plunger may be determined; i. e., the pin in abutting one end of the slot registers the pockets with the apertures 34 and 36 and in abutting the other end of the slot assures exposure of the pockets.

Reciprocating means for the plunger further includes the V-shaped plunger actuator member 14 pivoted at its vertex 59 to side wall 22 below the plunger support 38. As shown in Fig. 1, one arm 60 of the actuator member has a perpendicularly offset portion 62 with a slot 64 therein receiving pin 58. The other arm 66 of the actuator has a perpendicular portion 68 providing a thumb rest through which pressure may be exerted to move the actuator. A spiral spring 70 attached between the actuator member and the wall biases the plunger in the withdrawn position. To dispense bait, it is only necessary to press the thumb rest 68 whereby the plunger is brought forward. Washers 72 may be provided on either side of the offset portion about the pin 58 to provide a more nearly friction-free connection.

The device may be made of wood with the walls 24 and 26 of wire screen the support 38 and actuator member 14 of metal. Alternately, and preferably, the entire device may be made of a rigid plastic. Obviously, other materials may be employed in manufacture.

The use of the live bait dispenser is clear. A number of crickets, roaches, or similar bait are introduced through access hole 30 into the receptacle 10. The insects in seeking refuge will climb the walls. On finding the tunnel-like apertures 34 and 36 they will climb therein through the apertures in the support member 38 and into the pockets in the plunger 48. In this space they rest. The fisherman, on desiring bait, will merely press downwardly on the thumb rest 68 causing the plunger to carry the insects forward until the openings in the pockets are exposed, whereupon the insects will fall into the waiting palm of the fisherman. The invention as illustrated depicts a pair of openings in the wall 22 and a pair of pockets in the dispenser plunger. While the device would work well with only one aperture and one pocket, two afford a dispensing of a pair of insects at a single stroke of the plunger. With the construction shown, one insect may be dispensed by giving the plunger a half-stroke.

Thus, I have invented a live bait dispenser which is simple of manufacture and operation. Its simplicity of operation is achieved through its novel means of taking advantage of the natural instinct of the insect to seek refuge in high places.

While this invention has been shown in but one form, it is obvious to those skilled in the art that it is not so limited but is susceptible of various changes and modifications without departing from the spirit and scope of the claimed invention.

I claim as my invention:

1. A live bait dispenser comprising a receptacle defined by a bottom wall, side walls extending upwardly from said bottom wall and a top wall attached to the upper ends of said side walls, one of said side walls having an aperture near the upper end thereof, a tubular dispensing plunger support member mounted against the outside of said apertured wall over said aperture, said support member having an aperture therein aligned with the aperture in said wall, said support member having an imperforate floor portion and also having a slot running longitudinally thereof in a side thereof away from said receptacle, a dispensing plunger, and said support member receiving said dispensing plunger, said dispensing plunger adapted to be reciprocated longitudinally in said support, means to reciprocate said plunger in said support including a pin fastened to said plunger and extending through said slot, said plunger having a pocket therein, said pocket having an opening adjacent said apertured wall of the receptacle, and a second opening adjacent the imperforate floor of said support member, said first opening in said plunger being adapted to register with the apertures in said wall and said support member when said plunger is in a first position, said second opening in said plunger being closed by said imperforate floor of the support when said plunger is in said first position, said openings being both exposed outside of said receptacle when said plunger is moved forward to assume a second position, whereby when said plunger is in said first position a live insect captive in said receptacle can climb through said wall and said support member into said pocket, and whereby when said plunger is moved forward to said second position such insect is carried forward and drops through said second opening in said pocket to the outside of said receptacle.

2. A live bait dispenser as described in claim 1 wherein means to reciprocate said plunger also includes a V-shaped actuator member pivoted at its vertex to the outside of the apertured wall of said receptacle and having a slot in one arm thereof receiving said pin and a thumb rest on the other arm, whereby as said thumb rest is pressed, said plunger moves from said first position to said second position.

3. A live bait dispenser as described in claim 2 wherein said actuator is biased to a position where said plunger is in said first position.

4. A live bait dispenser as described in claim 1 wherein said top wall has an access hole therein, said access hole having a sleeve mounted therein for reciprocation away from and into said receptacle.

5. A live bait dispenser comprising a container, a movable dispensing means supported adjacent the top of said container, said dispensing means having a pocket therein, said dispensing means being adapted to be moved from a first position to a second position, said pocket being accessible from the inside of the container and closed to the outside of the container when said dispensing means is in said first position, and said pocket being open to the outside of said container when said dispensing means is in said second position whereby when said dispensing means is in said first position a live insect captive in said container can climb upwardly in said container and into said pocket, and whereby when said dispensing means is moved to said second position such insect is carried in said pocket and dispensed to the outside of said container.

6. A live bait dispenser comprising a receptacle defined by a bottom wall, side walls attached to and extending upwardly from said bottom wall and a top wall attached to the upper ends of said side walls, one of said side walls having an aperture near the top thereof, a dispensing plunger support member comprising a horizontal imperforate floor mounted against the outside of said apertured wall adjacent said aperture, a dispensing plunger, said plunger support member supporting said dispensing plunger and said dispensing plunger being adapted to be reciprocated longitudinally from a first to a second position on said support member, said dispensing plunger having a pocket therein, said pocket having an opening on its side adjacent said apertured wall of the receptacle, and a second opening on its side adjacent the imperforate floor of said support, said first opening in said dispensing plunger adapted to register with the aperture in said wall when said plunger is in said first position, said second opening in said plunger being closed by said imperforate floor of the support when said dispensing plunger is in said first position, said second opening being exposed outside of said receptacle when said plunger is moved to assume said second position, whereby when said dispensing plunger is in said first position, a live insect captive in said receptacle can climb up a wall of said receptacle and through said aperture in said apertured wall and into said pocket, and whereby when said plunger is moved to said second position such insect is carried in said pocket and drops through said second opening in said pocket to the outside of said receptacle.

References Cited in the file of this patent

UNITED STATES PATENTS

| | | |
|---|---|---|
| 1,708,130 | Guest | Apr. 9, 1929 |
| 2,059,608 | Rochester | Nov. 3, 1936 |
| 2,346,744 | Glassman | Apr. 18, 1944 |